(12) United States Patent
Obana et al.

(10) Patent No.: US 10,796,540 B2
(45) Date of Patent: Oct. 6, 2020

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

(71) Applicant: NINTENDO CO., LTD., Kyoto OT (JP)

(72) Inventors: Kazutoshi Obana, Kyoto (JP); Takafumi Aoki, Kyoto (JP); Kochi Kawai, Kyoto (JP); Junichiro Miyatake, Kyoto (JP); Kei Yamashita, Kyoto (JP); Shoji Masubuchi, Kyoto (JP); Masahiko Inami, Yokohama (JP); Kouta Minamizawa, Yokohama (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/686,094

(22) Filed: Apr. 14, 2015

(65) Prior Publication Data
US 2015/0348378 A1    Dec. 3, 2015

(30) Foreign Application Priority Data

May 30, 2014    (JP) .................................. 2014-112482

(51) Int. Cl.
*G08B 6/00*     (2006.01)
*G06F 3/16*     (2006.01)
(Continued)

(52) U.S. Cl.
CPC ................ *G08B 6/00* (2013.01); *A63F 13/28* (2014.09); *A63F 13/54* (2014.09); *G06F 3/165* (2013.01); *A63F 2300/204* (2013.01)

(58) Field of Classification Search
CPC . G06F 3/16; G06F 3/165; G06F 3/016; G06F 3/162; G06F 3/167; H04S 3/00;
(Continued)

(56) References Cited

U.S. PATENT DOCUMENTS 9,002,020 B1 *  4/2015  Kim ....................... H04R 17/10
                                                       381/56
2002/0163498 A1   11/2002  Chang et al.
(Continued)

FOREIGN PATENT DOCUMENTS

EP    0 952 555    10/1999
EP    1 033 158     9/2000
(Continued)

OTHER PUBLICATIONS

Sennheiser Worldwide Service & Support Download area; including spec sheet download for HD 595; available on or before Feb. 9, 2011 (Year: 2011).*
(Continued)

*Primary Examiner* — Andrew C Flanders
(74) *Attorney, Agent, or Firm* — Nixon & Vanderhye, P.C.

(57) ABSTRACT

A sound source localization position indicating a position where a sound source is localized is set, and a sound signal for localizing the sound source at the set sound source localization position is generated and output. Then, a vibration signal for, in conjunction with the sound source localization position, vibrating a vibrator for imparting a vibration to a user is generated and output.

16 Claims, 10 Drawing Sheets

(51) Int. Cl.
*A63F 13/28* (2014.01)
*A63F 13/54* (2014.01)

(58) Field of Classification Search
CPC .......... H04S 3/02; H04S 5/00; H04S 2400/01;
H04S 2420/01; H04S 2420/11; H04S
7/40; H04S 7/303; A63F 13/28; A63F
13/285; A63F 13/25; A63F 13/54; A63F
2300/6081; A63F 2300/6063; A63F
2300/1037; G06B 6/00
See application file for complete search history.

(56) References Cited

U.S. PATENT DOCUMENTS

| | | | |
|---|---|---|---|
| 2005/0212755 A1* | 9/2005 | Marvit | G06F 1/1626 345/156 |
| 2006/0252474 A1 | 11/2006 | Zalewski et al. | |
| 2008/0112581 A1* | 5/2008 | Kim | H04R 1/1075 381/151 |
| 2009/0221374 A1 | 9/2009 | Yen et al. | |
| 2009/0304210 A1* | 12/2009 | Weisman | H04R 1/1083 381/151 |
| 2010/0246831 A1* | 9/2010 | Mahabub | G10L 19/018 381/17 |
| 2011/0208331 A1* | 8/2011 | Sandler | H04S 7/30 700/94 |
| 2011/0260996 A1 | 10/2011 | Henricson | |
| 2012/0124470 A1* | 5/2012 | West | G06F 3/0488 715/702 |
| 2014/0064494 A1* | 3/2014 | Mahabub | G10L 19/018 381/17 |
| 2014/0153765 A1* | 6/2014 | Gan | H04R 1/1075 381/374 |
| 2014/0171195 A1* | 6/2014 | Searchfield | A63F 9/0001 463/31 |
| 2015/0070153 A1* | 3/2015 | Bhatia | G06F 3/016 340/407.1 |

FOREIGN PATENT DOCUMENTS

| | | |
|---|---|---|
| EP | 1 195 979 | 4/2002 |
| JP | 2003-275464 | 9/2003 |
| WO | WO 03/032289 | 4/2003 |
| WO | WO2011/043292 | 4/2011 |

OTHER PUBLICATIONS

Sennheiser HD 515, HD 555 and 595 spec sheet; available on or before Feb. 9, 2011 (Year: 2011).*

European Search Report dated Oct. 13, 2015 issued in corresponding European Application No. 15163510.9 (7 pages).

* cited by examiner

F I G. 13
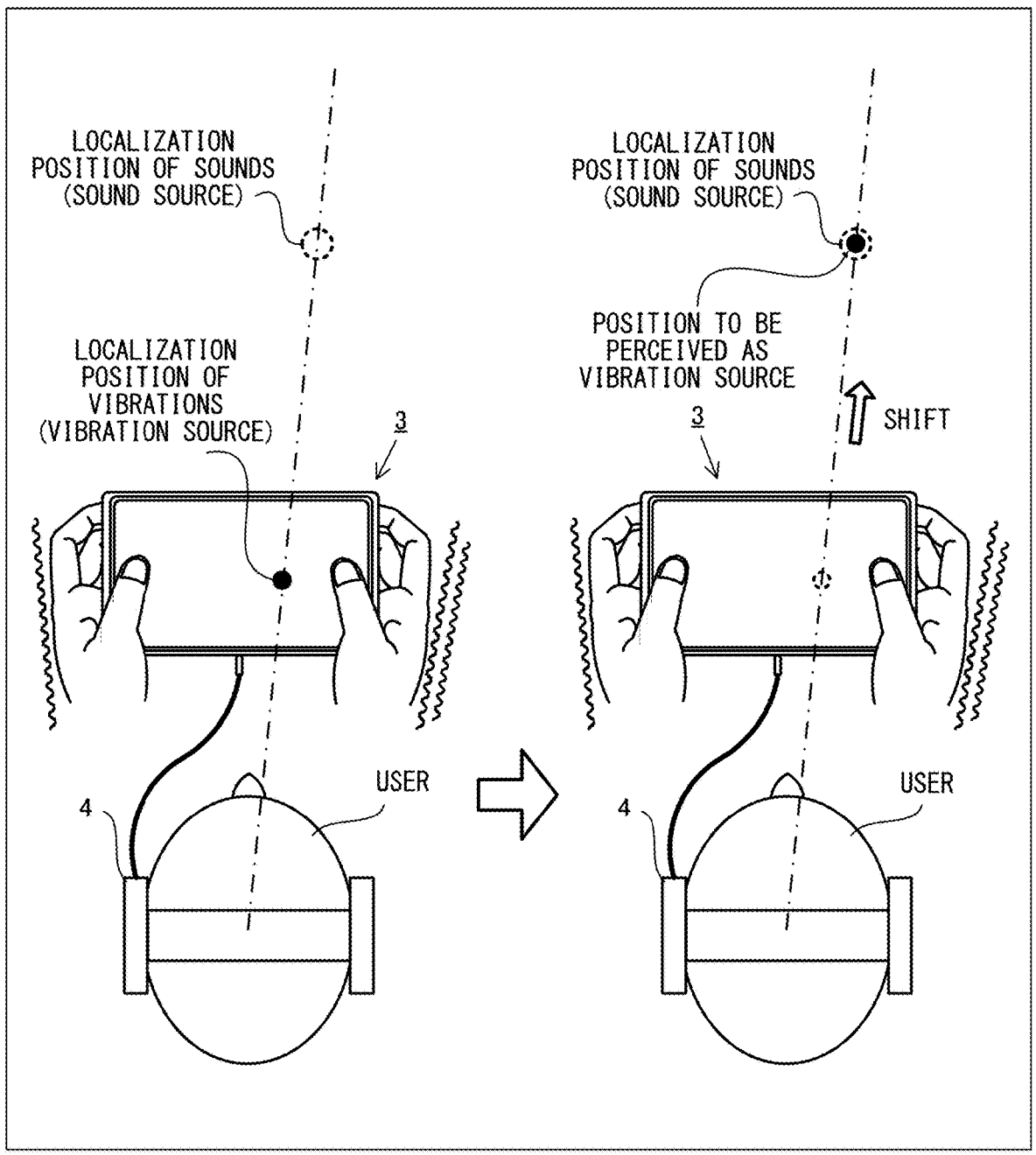

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2014-112482, filed on May 30, 2014, is incorporated herein by reference.

FIELD

The technology shown here relates to an information processing system, an information processing apparatus, a storage medium having stored therein an information processing program, and an information processing method, and in particular, relates to an information processing system, an information processing apparatus, and an information processing method for, for example, controlling vibrations to be imparted to a user, and a storage medium having stored therein an information processing program for, for example, controlling vibrations to be imparted to a user.

BACKGROUND AND SUMMARY

Conventionally, a game apparatus for imparting vibrations to the main body of the apparatus is known. For example, the game apparatus vibrates vibrators provided in the game apparatus, thereby transmitting vibrations to the finger and the hand of a user holding the game apparatus.

The game apparatus, however, can merely impart monotonous vibrations having their vibration sources near the vibrators to the user.

Therefore, it is an object of an exemplary embodiment to provide an information processing system, an information processing apparatus, and an information processing method that are capable of causing a user to perceive unconventional vibrations, and a storage medium having stored therein an information processing program capable of causing a user to perceive unconventional vibrations.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing system according to an exemplary embodiment, an information processing system includes one or more processors configured to: as sound source position setting, set a sound source localization position indicating a position where a sound source is localized; as sound control, generate a sound signal for localizing the sound source at the set sound source localization position, and output the generated sound signal; and as vibration control, generate a vibration signal for, in conjunction with the sound source localization position, vibrating a vibrator for imparting a vibration to a user, and output the generated vibration signal.

Based on the above, it is possible to expand the position to be perceived by a user as a vibration source to the space where a sound source can be localized. This enables the user to perceive unconventional vibrations.

In addition, in the vibration control, the vibration signal may be generated such that a position to be perceived by the user as a vibration source is a position corresponding to the sound source localization position.

Based on the above, it is possible to cause the user to perceive a sound source localization position as the vibration source.

In addition, in the sound source position setting, the sound source localization position may be set such that the sound source localization position shifts. In the vibration control, the vibration signal may be generated such that the position to be perceived by the user as the vibration source shifts in accordance with the shift of the sound source localization position.

Based on the above, the position of the vibration source is shifted in conjunction with the shift of the position of the sound source. This makes it possible to impart sounds and vibrations rich in variety to the user.

In addition, in the vibration control, the vibration signal for changing an intensity of a vibration may be generated in accordance with the sound source localization position.

Based on the above, it is possible to impart a vibration suitable for the distance and the direction from a listener to the sound source.

In addition, the information processing system may include a handheld apparatus, a sound output unit, and a control unit. The sound output unit outputs a sound. The control unit includes one or more processors configured to perform the sound source position setting, the sound control, and the vibration control. The handheld apparatus may include the vibrator in a main body of the handheld apparatus. In the sound control, the sound signal may be output to the sound output unit. In the vibration control, the vibration signal may be output to the vibrator, thereby vibrating the vibrator in conjunction with the sound source localization position.

Based on the above, a vibration is imparted to a handheld apparatus, and the sound source is localized outside the handheld apparatus. This enables the user to perceive a vibration as being imparted from outside the handheld apparatus.

In addition, the vibrator may include a plurality of vibrators provided in the main body of the handheld apparatus. In the vibration control, vibration signals for vibrating the plurality of vibrators may be generated such that a position in conjunction with the sound source localization position is perceived as a vibration source.

Based on the above, it is possible to set the vibration source between a plurality of vibrators, and further shift the position of the vibration source to the position where the sound source is localized. This further expands the range where the vibration source can be set.

In addition, in the vibration control, proportions of intensities of vibrations for vibrating the plurality of vibrators may be changed, thereby generating the vibration signals for causing the user to perceive the vibration source as shifting.

Based on the above, the proportions of intensities of vibrations for vibrating the plurality of vibrators are changed. This easily enables the user to perceive the vibration source as shifting.

In addition, the sound output unit may include a plurality of loudspeakers. In the sound control, sound signals for outputting, from the plurality of loudspeakers, sounds for localizing sound sources at the sound source localization position may be generated.

Based on the above, the range where a sound can be localized is expanded. This can also expand the range where the vibration source is shifted.

In addition, in the sound control, the sound signal may be generated based on a function for calculating a sound coming from the sound source to each of a left ear and a right ear of the user at a predetermined listening position.

Based on the above, a sense of localization of sounds becomes clear. Thus, the position of the vibration source to be perceived by the user as having shifted to the localization position of a sound also becomes clear.

In addition, the function may be set based on a sound pressure level characteristic corresponding to a frequency.

Based on the above, it is possible to clearly set the location of the sound source to be perceived by a listener.

In addition, the function may be set based on a sound pressure level characteristic corresponding to a direction of the sound source.

Based on the above, it is possible to clearly set the location of the sound source to be perceived by a listener.

In addition, the function may be a head-related transfer function.

Based on the above, it is possible to more clearly set the location of the sound source to be perceived by a listener.

In addition, in the sound control, the sound signal may be generated using data in which a sound coming from the sound source to each of a left ear and a right ear of the user at a predetermined listening position is recorded.

Based on the above, data is used in which the states per se of sounds reaching the ears of a listener are recorded. This can provide a sense of localization of sounds to the user listening to the sounds.

In addition, in the vibration control, a vibration source localization position indicating a position where a vibration source is localized may be set in a direction in which the sound source is localized, and the vibration signal may be generated such that the vibration source is localized at the set vibration source localization position.

Based on the above, it is possible to cause the user to clearly perceive the vibration source as having shifted to the position where the sound source is localized.

In addition, the information processing system may further include a handheld apparatus. In this case, in the vibration control, the vibration source localization position may be set substantially on a straight line extending from the user holding the handheld apparatus to the position where the sound source is localized.

Based on the above, it is possible to cause the user to more clearly perceive the vibration source as having shifted to the position where the sound source is localized.

In addition, in the vibration control, the vibration signal for changing an intensity of a vibration for vibrating the handheld apparatus may be generated in accordance with a distance from the sound source localization position.

Based on the above, it is possible to impart a vibration suitable for the distance from a listener to the sound source.

In addition, the handheld apparatus may include a display. The one or more processors of the information processing system may be further configured to, as image control, control an image to be displayed on the display.

Based on the above, it is possible to impart to the user a sound and a vibration corresponding to a display image. This can provide a highly realistic experience to the user.

In addition, in the image control, at least one object may be displayed on the display. In the sound source position setting, the position where the sound source is localized may be set in accordance with a position where the object is displayed on the display.

Based on the above, the sound source is localized in accordance with the display position of an object. This can provide a more highly realistic experience to the user.

In addition, the sound output unit may be headphones.

Based on the above, it is possible to output a sound that makes clear the location of the sound source to be perceived by a listener.

In addition, the exemplary embodiment may be carried out in the form of an information processing apparatus, a storage medium having stored therein an information processing program, or an information processing method.

In addition, in another exemplary configuration of the information processing apparatus according to the exemplary embodiment, an information processing apparatus is a handheld information processing apparatus. The information processing apparatus includes: a plurality of vibrators provided within the information processing apparatus; and one or more processors configured to: set, outside the information processing apparatus, a sound source localization position indicating a position where a sound source is localized; generate a sound signal for localizing the sound source at the set sound source localization position, and output the generated sound signal; set, between the plurality of vibrators and in conjunction with the sound source localization position, a vibration source localization position indicating a position where a vibration source is localized; and generate a vibration signal for localizing the vibration source at the set vibration source localization position, and output the generated vibration signal.

Based on the above, it is possible to expand the position to be perceived by a user as a vibration source to the space where a sound source can be localized. This enables the user to perceive unconventional vibrations. Further, the vibration source is localized between a plurality of vibrators, and the sound source is localized outside the information processing apparatus. This enables the user to perceive the vibration source in the information processing apparatus as having shifted to outside the apparatus.

According to the exemplary embodiment, it is possible to expand the position to be perceived by a user as a vibration source to the space where a sound source can be localized. This enables the user to perceive unconventional vibrations.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 13 is a diagram showing a non-limiting example of the relationship between the localization position of sounds and the position to be perceived by a user as a vibration source;

DETAILED DESCRIPTION OF NON-LIMITING EXAMPLE EMBODIMENTS

With reference to the drawings, a description is given of an information processing system including an information processing apparatus for executing an information processing program according to an exemplary embodiment. While the information processing program according to the exemplary embodiment can be applied by being executed by any computer system, a mobile information processing apparatus 3 (a tablet terminal) is used as an example of the information processing apparatus, and the information processing program according to the exemplary embodiment is described using an information processing program executed by the information processing apparatus 3. For example, the information processing apparatus 3 can execute a program and a pre-installed program (e.g., a game program) stored in a storage medium such as an exchangeable optical disk or an exchangeable memory card, or received from another apparatus. As an example, the information processing apparatus 3 can display on a screen an image generated by a computer graphics process, such as a virtual space image viewed from a virtual camera set in a virtual space. The information processing apparatus 3 may be a device such as a general personal computer, a stationary game apparatus, a mobile phone, a mobile game apparatus, or a PDA (Personal Digital Assistant). It should be noted that FIG. 1 is a plan view of an example of the external appearance of an information processing system including the information processing apparatus 3.

Figure 1:
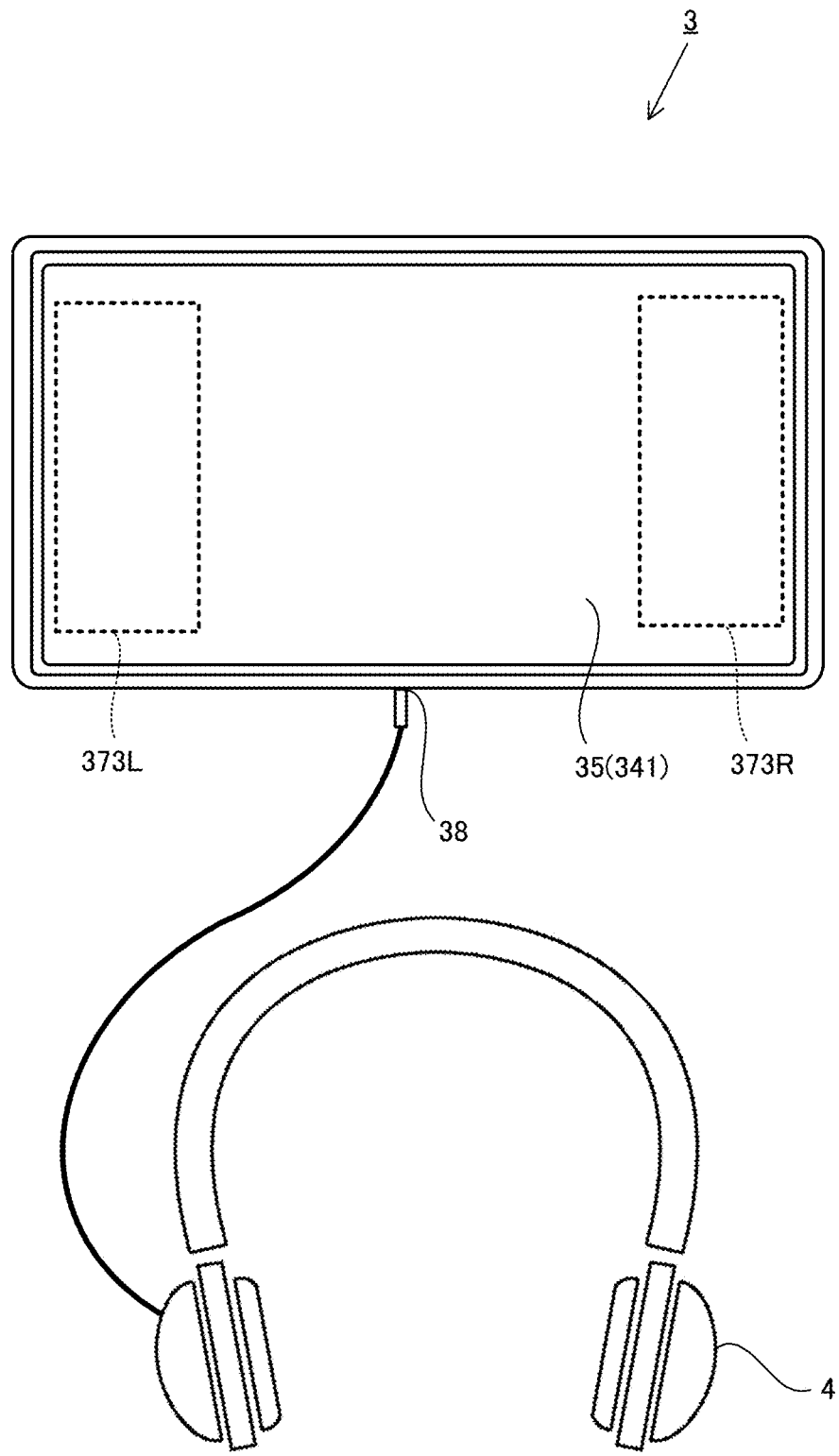
FIG. 1 is a plan view of a non-limiting example of the external appearance of an information processing apparatus 3 according to an exemplary embodiment.

In FIG. 1, the information processing system includes the information processing apparatus 3 and a sound output apparatus 4, which is connected to the information processing apparatus 3. The information processing apparatus 3 includes a display section 35, a sound output section 36, a sound output terminal 38, and an actuator 373. As an example, the display section 35 is provided on the front surface of the main body of the information processing apparatus 3. For example, the display section 35 includes an LCD (Liquid Crystal Display) and may employ, for example, a display device using EL. Further, the display section 35 may be a display device capable of displaying a stereoscopically viewable image.

A touch panel 341, which is an example of an input section 34, is provided so as to cover a display screen of the display section 35. The touch panel 341 detects the position of an input provided to a predetermined input surface (e.g., the display screen of the display section 35). It should be noted that the input section 34 is an input device that allows a user of the information processing apparatus 3 to input an operation, and the input section 34 may be any input device. For example, as the input section 34, an operation section such as a slide pad, an analog stick, a directional pad, an operation button, or the like may be provided on the side surfaces, the back surface, or the like of the main body of the information processing apparatus 3. Further, the input section 34 may be a sensor for detecting the orientation and the motion of the main body of the information processing apparatus 3. For example, the input section 34 may be an acceleration sensor for detecting the acceleration generated in the main body of the information processing apparatus 3, an angular velocity sensor (a gyro sensor) for detecting the amount of rotation of the main body of the information processing apparatus 3, or the like.

The actuator 373 is a vibration actuator (a vibrator) for imparting predetermined vibrations to the main body of the information processing apparatus 3 and is included in a vibration generation section 37 described later. In the example shown in FIG. 1, the actuator 373 includes a left actuator 373L, which is provided on the left and inside the main body of the information processing apparatus 3, and a right actuator 373R, which is provided on the right and inside the main body of the information processing apparatus 3. Specifically, as indicated by dashed line areas in FIG. 1, the left actuator 373L is provided on the left side of the display section 35, which is a position near the left hand of the user when holding a left end portion of the information processing apparatus 3 in the left hand. Further, the right actuator 373R is provided on the right side of the display section 35, which is a position near the right hand of the user when holding a right end portion of the information processing apparatus 3 in the right hand. Further, the vibration generation section 37 performs D/A conversion on vibration control signals (a left vibration control signal and a right vibration control signal) output from the control section 31 described later, thereby generating analog vibration signals (a left analog vibration signal and a right analog vibration signal). Then, the vibration generation section 37 outputs driving signals obtained by amplifying the analog vibration signals to the actuator 373 (the left actuator 373L and the right actuator 373R), thereby driving the actuator 373.

The sound output terminal 38 is a terminal for outputting sound signals to the sound output apparatus 4 provided outside the information processing apparatus 3. For example, the sound output terminal 38 is connected to a connection terminal provided in a cord of the sound output apparatus 4 (e.g., an apparatus for outputting sounds by being attached to the head or the ears of the user, such as headphones or earphones, external loudspeakers, or the like). The information processing apparatus 3 outputs sound signals (a left sound control signal and a right sound control signal) from a control section 31 described later. Further, a sound signal conversion section 36 described later performs D/A conversion on the output sound signals to generate analog sound signals (a left analog sound signal and a right analog sound signal) and outputs the generated analog sound signals to the sound output terminal 38. Then, the sound output apparatus 4 connected to the sound output terminal 38 outputs sounds corresponding to the sound signals.

It should be noted that the information processing apparatus 3 may include a pair of stereo loudspeakers (a left loudspeaker 36L and a right loudspeaker 36R) provided on the left and right of the upper side surface or the back surface of the main body of the information processing apparatus 3. In this case, if the connection terminal is not connected to the sound output terminal 38, the information processing apparatus 3 outputs the analog sound signals to the loudspeakers provided in the main body of the information processing apparatus 3. If the connection terminal has been connected to the sound output terminal 38, the information processing apparatus 3 outputs the analog sound signals to the sound output apparatus 4 connected to the sound output terminal 38.

Figure 2:
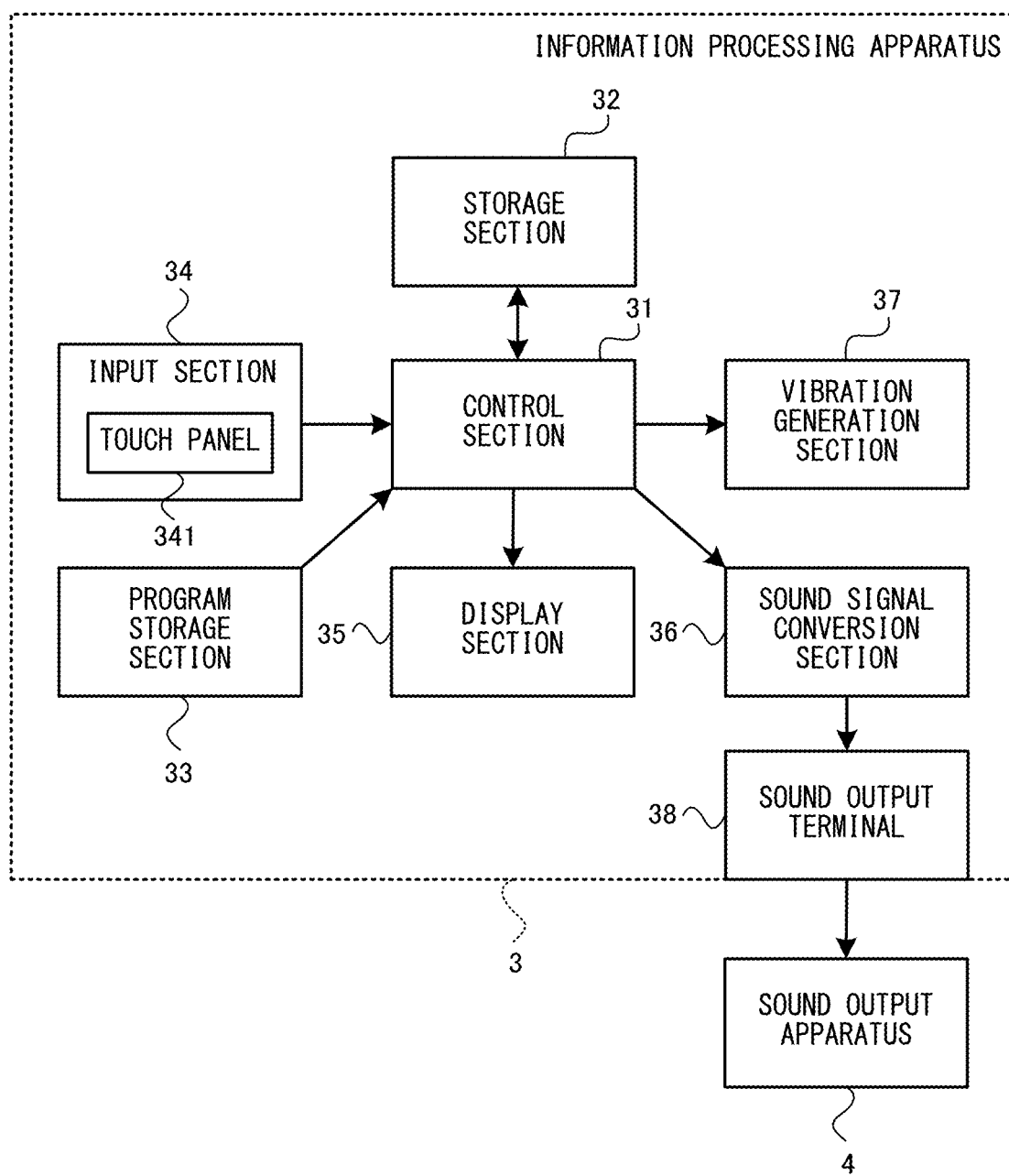
FIG. 2 is a block diagram showing a non-limiting example of the configuration of the information processing apparatus 3.

Next, with reference to FIG. 2, the internal configuration of the information processing apparatus 3 is described. It should be noted that FIG. 2 is a block diagram showing an example of the configuration of the information processing apparatus 3.

In FIG. 2, the information processing apparatus 3 includes the control section 31, a storage section 32, the sound signal conversion section 36, and a program storage section 33 in addition to the input section 34, the display section 35, the sound output terminal 38, and the vibration generation section 37, which are described above. It should be noted that the information processing apparatus 3 may be composed of one or more apparatuses including: an information processing apparatus having at least the control section 31; and another apparatus.

The control section 31 is information processing means (a computer) for performing various types of information processing and is, for example, a CPU. The control section 31 has the function of performing, as the various types of information processing, processing or the like corresponding to an operation performed on the input section 34 by the user. For example, the functions of the control section 31 are achieved by, for example, the CPU executing a predetermined program.

As the various types of information processing, the control section 31 controls the display of an image to be displayed on the display section 35. Further, as the various types of information processing, the control section 31 outputs, to the sound signal conversion section 36, sound control signals (e.g., digital sound signals) for controlling sounds to be output from the sound output apparatus 4. Further, as the various types of information processing, the control section 31 outputs, to the vibration generation section 37, vibration control signals (e.g., digital vibration signals) for controlling vibrations of the actuator 373 (the left actuator 373L and the right actuator 373R).

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus 3 having the control section 31, or may be a storage medium detachably attached to the information processing apparatus 3 having the control section 31. Alternatively, the program storage section 33 may be a storage device (a server or the like) connected to the control section 31 via a network. The control section 31 (the CPU) may read a part or all of the program to the storage section 32 at appropriate timing and execute the read program.

The sound signal conversion section 36 performs D/A conversion on sound signals (a left sound control signal and a right sound control signal) output from the control section 31, thereby generating analog sound signals (a left analog sound signal and a right analog sound signal). Then, if the connection terminal of the sound output apparatus 4 has been connected to the sound output terminal 38, the sound signal conversion section 36 outputs the analog sound signals to the sound output terminal 38. If, on the other hand, the connection terminal is not connected to the sound output terminal 38, the sound signal conversion section 36 outputs the analog sound signals to the loudspeakers (e.g., stereo loudspeakers) build into the information processing apparatus 3, thereby causing the loudspeakers to output sounds. It should be noted that if the connection terminal has been connected to the sound output terminal 38, the sound signal conversion section 36 may output to the control section 31 a sound switching signal indicating that the connection terminal has been connected to the sound output terminal 38, and the sound output destination has been switched to the external sound output apparatus 4.

Figure 3:
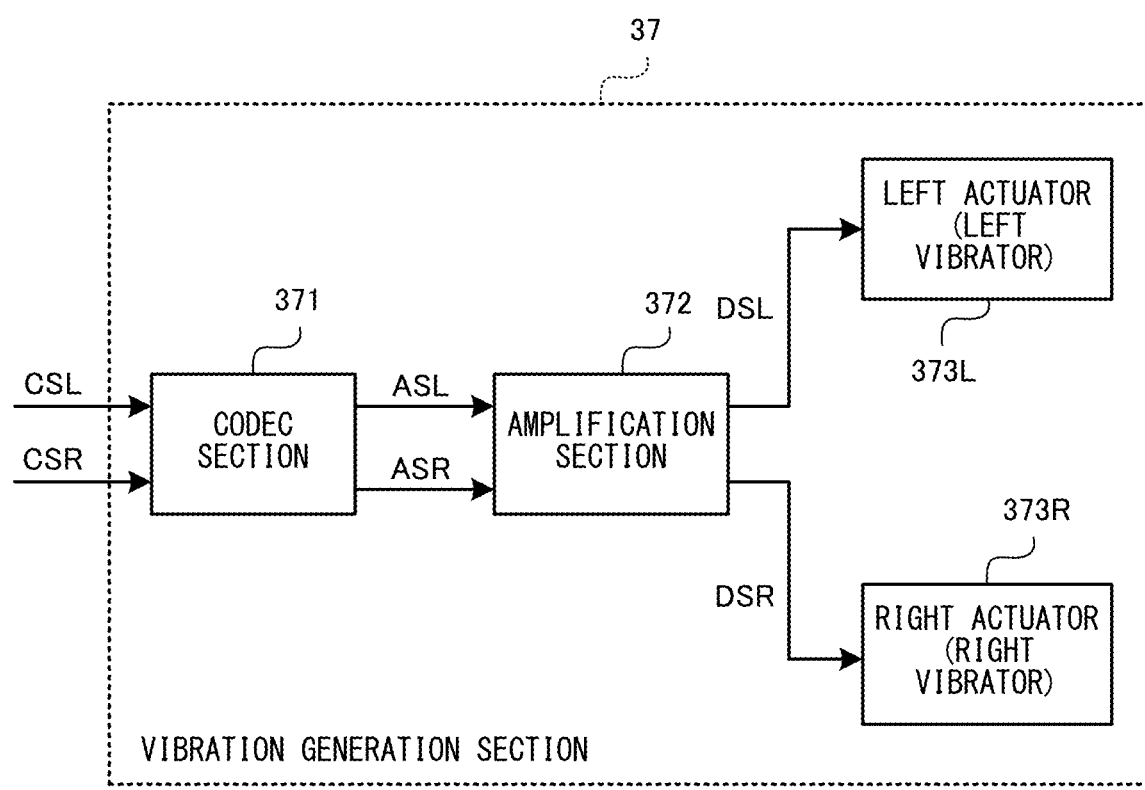
FIG. 3 is a block diagram showing a non-limiting example of the configuration of a vibration generation section 37.

Next, with reference to FIG. 3, the configuration of the vibration generation section 37 is described. It should be noted that FIG. 3 is a block diagram showing an example of the configuration of the vibration generation section 37.

In FIG. 3, the vibration generation section 37 includes a codec section 371, an amplification section 372, the left actuator (left vibrator) 373L, and the right actuator (right vibrator) 373R.

The codec section 371 acquires vibration control signals output from the control section 31 and performs a predetermined decoding process on the vibration control signals, thereby generating analog vibration signals. Then, the codec section 371 outputs the analog vibration signals to the amplification section 372. For example, if a plurality of actuators 373 are provided and independent vibrations are generated by the respective actuators 373 (e.g., the left actuator 373L and the right actuator 373R), the control section 31 outputs vibration control signals (e.g., a left vibration control signal CSL and a right vibration control signal CSR) for controlling vibrations in the respective actuators 373. In this case, the codec section 371 decodes the vibration control signals output from the control section 31, thereby generating analog vibration signals (e.g., a left analog vibration signal ASL and a right analog vibration signal ASR) for generating vibrations in the respective actuators 373. Then, the codec section 371 outputs the analog vibration signals to the amplification section 372.

The amplification section 372 amplifies the analog vibration signals output from the codec section 371, thereby generating driving signals for driving the actuator 373. Then, the amplification section 372 outputs the driving signals to the actuator 373. For example, if a plurality of actuators 373 are provided (e.g., if the left actuator 373L and the right actuator 373R are provided), the amplification section 372 increases changes in the amplitudes of the current and/or the voltage of each of the analog vibration signals (e.g., the left analog vibration signal ASL and the right analog vibration signal ASR) output from the codec section 371, thereby generating driving signals (e.g., a left driving signal DSL and a right driving signal DSR). Then, the amplification section 372 outputs the driving signals to the respective actuators 373 (e.g., the left actuator 373L and the right actuator 373R). It should be noted that when adjusting the output gain in accordance with an instruction from the control section 31, the amplification section 372 acquires output gain adjustment instruction data from the amplification section 372 and changes the output gain (e.g., an amplification factor for amplifying an analog vibration signal) in accordance with the acquired output gain adjustment instruction data.

The actuator 373 is driven in accordance with the driving signals output from the amplification section 372, thereby imparting vibrations corresponding to the driving signals to the main body of the information processing apparatus 3. For example, as shown in FIG. 1, the actuator 373 includes the left actuator 373L and the right actuator 373R, which are provided on the left side and the right side of the main body of the information processing apparatus 3 with respect to the center of the display screen of the display section 35. As an example, the left actuator 373L is placed in a part of the main body of the information processing apparatus 3 that is held by the user in the left hand, and the right actuator 373R is placed in a part of the main body of the information processing apparatus 3 that is held by the user in the right hand. Here, the method of the actuator 373 imparting vibrations to the main body of the information processing apparatus 3 may be any method. For example, the actuator 373 may use the method of generating vibrations by an eccentric motor (ERM: Eccentric Rotating Mass), the method of generating vibrations by a linear vibrator (LRA: Linear Resonant Actuator), the method of generating vibrations by a piezoelectric element, or the like. If the driving signals to be output from the amplification section 372 are generated in accordance with the method of the actuator 373 generating vibrations, an actuator using any method can impart various vibrations to the user of the information processing apparatus 3.

It should be noted that in the configuration of the vibration generation section 37, one or more codec sections and one or more amplification sections may be provided. For example, a codec section and an amplification section can be provided in each of a plurality of actuators 373 that are provided. In the above description, an example has been used where driving signals for driving the actuator 373 are generated by amplifying the analog vibration signals generated by the codec section 371. Alternatively, the signals output from the codec section 371 to the amplification section 372 may be digital signals. For example, if the actuator 373 is driven by pulse width modulation (PWM) control, the codec section 371 may generate pulse signals for turning on and off the actuator 373. In this case, the signals output from the codec section 371 to the amplification section 372 are digital vibration signals for controlling the driving of the actuator 373 using pulse waves. Consequently, the amplification section 372 amplifies the digital vibration signals.

In addition, the codec section 371 of the vibration generation section 37 may also perform D/A conversion on sound signals, which is performed by the sound signal conversion section 36 (the process of performing D/A conversion on sound signals (a left sound control signal and a right sound control signal) output from the control section 31, thereby generating analog sound signals (a left analog sound signal and a right analog sound signal)). Further, the amplification section 372 of the vibration generation section 37 may also perform the process of amplifying the generated analog sound signals. In this case, the vibration generation section 37 and the sound signal conversion section 36 share a codec section and/or an amplification section.

Figure 4:
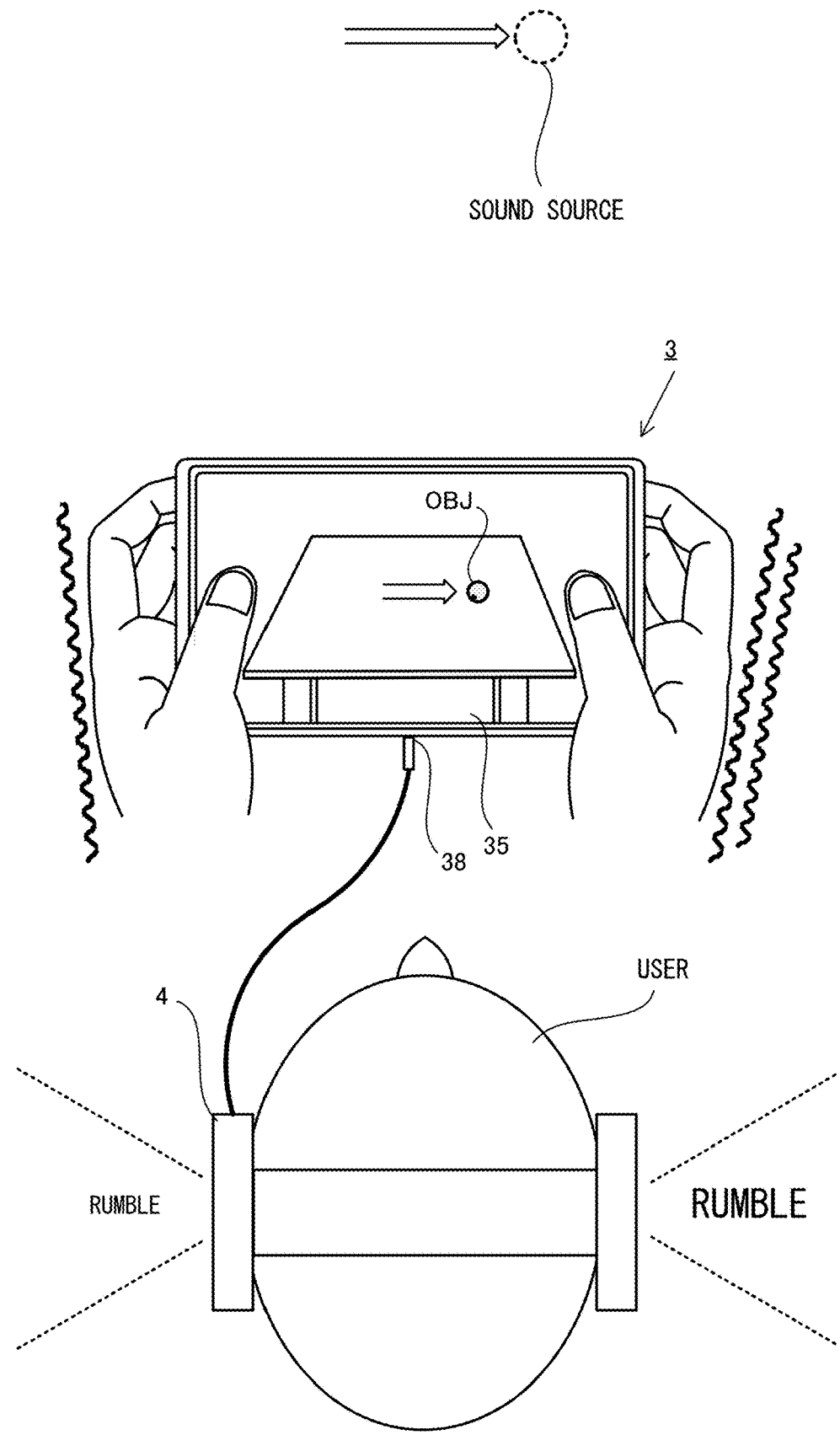
FIG. 4 is a diagram showing a non-limiting example where the main body of the information processing apparatus 3 vibrates, and simultaneously, sounds are output, in accordance with the display position of a virtual object OBJ displayed on the display screen of the display section 35.
Figure 5:
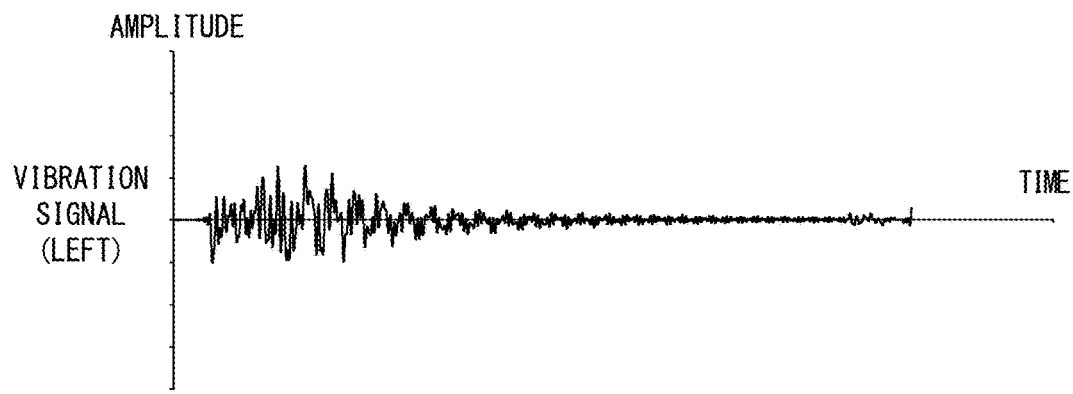
FIG. 5 is a diagram illustrating a non-limiting example of a vibration imparted to the left side of the main body of the information processing apparatus 3.
Figure 6:
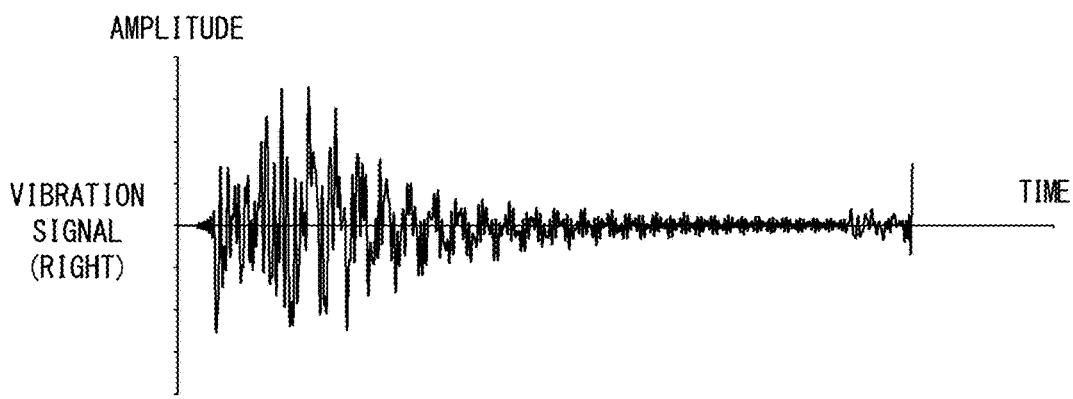
FIG. 6 is a diagram illustrating a non-limiting example of a vibration imparted to the right side of the main body of the information processing apparatus 3.
Figure 7:
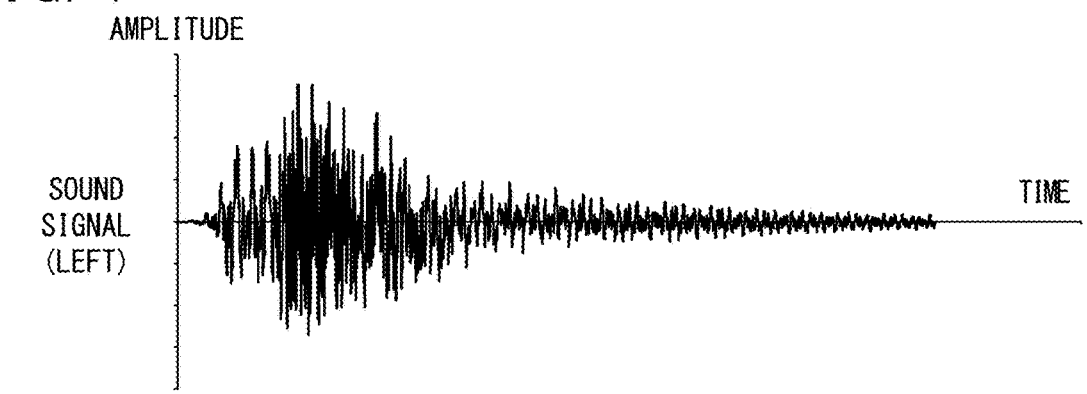
FIG. 7 is a diagram illustrating a non-limiting example of a left sound output from the sound output apparatus 4.
Figure 8:
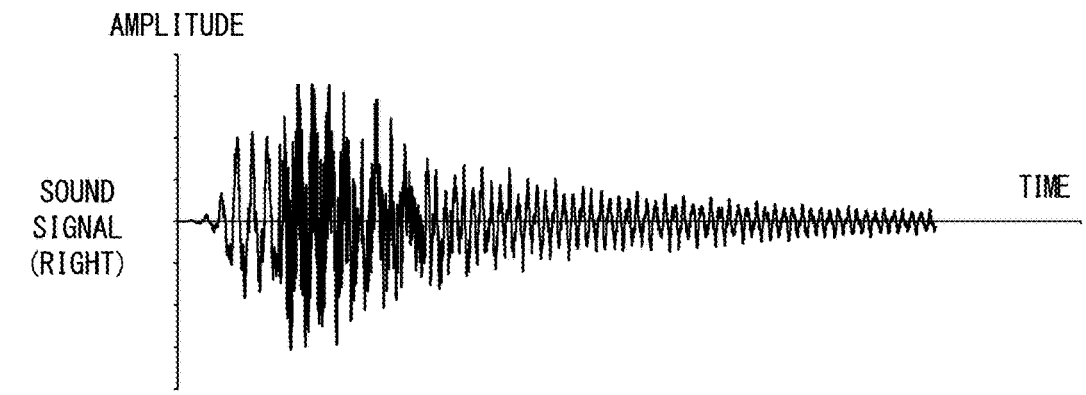
FIG. 8 is a diagram illustrating a non-limiting example of a right sound output from the sound output apparatus 4.
Figure 9:
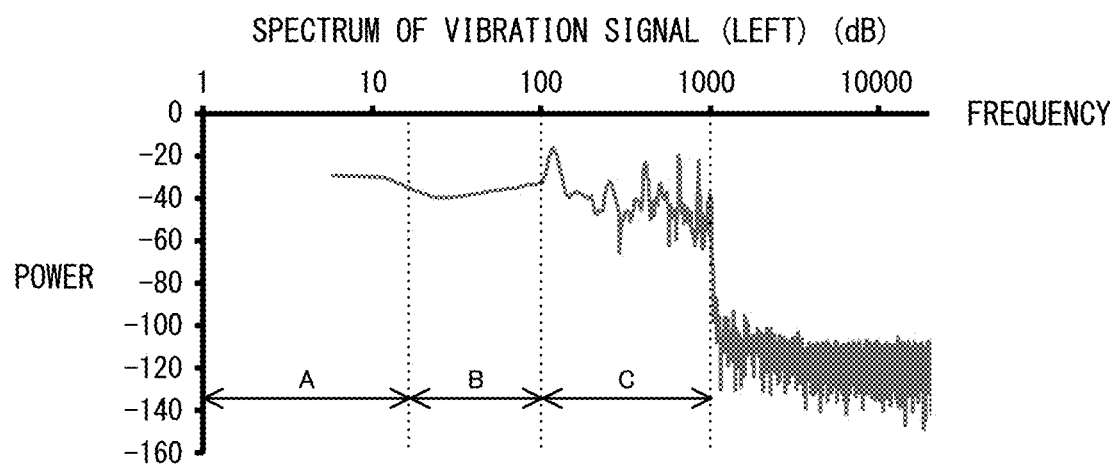
FIG. 9 is a diagram illustrating a non-limiting example of the spectrum of a vibration imparted to the left side of the main body of the information processing apparatus 3.
Figure 10:
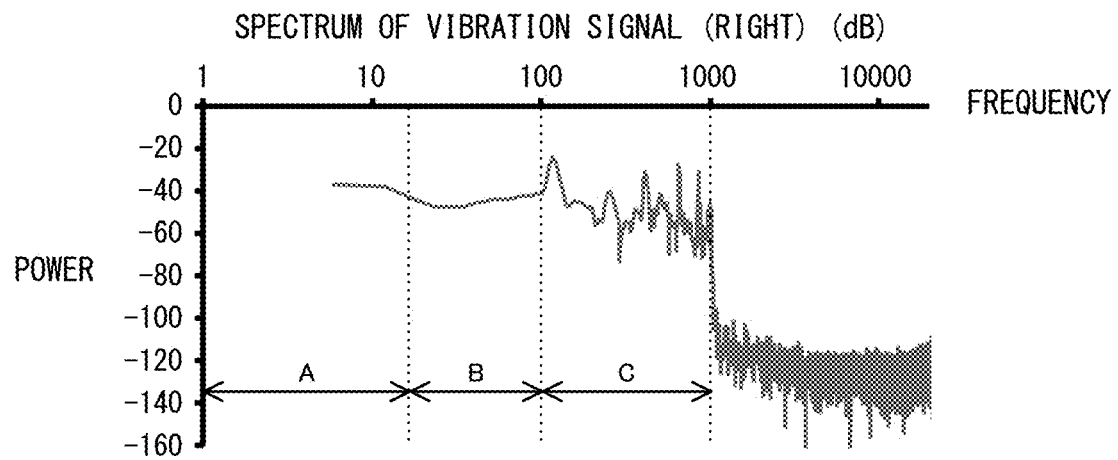
FIG. 10 is a diagram illustrating a non-limiting example of the spectrum of a vibration imparted to the right side of the main body of the information processing apparatus 3.
Figure 11:
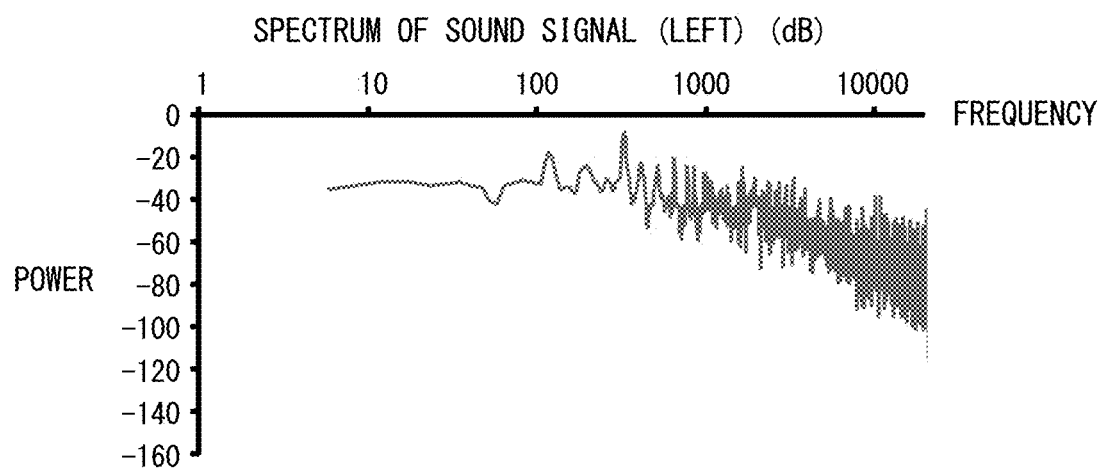
FIG. 11 is a diagram illustrating a non-limiting example of the spectrum of a left sound output from the information processing apparatus 3.
Figure 12:
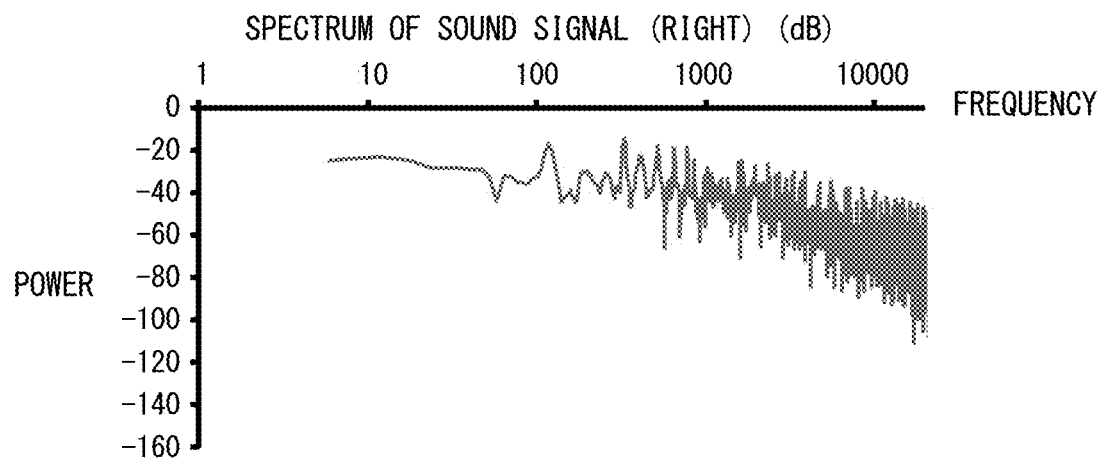
FIG. 12 is a diagram illustrating a non-limiting example of the spectrum of a right sound output from the information processing apparatus 3.

Next, with reference to FIGS. 4 to 13, a description is given of an overview of the processing performed by the information processing apparatus 3, before the description of specific processing performed by the information processing apparatus 3. In the following descriptions, the process of performing a game where a virtual object OBJ moves in the display screen of the display section 35 is used as an example of the information processing performed by the information processing apparatus 3. It should be noted that FIG. 4 is a diagram showing an example where the main body of the information processing apparatus 3 vibrates, and simultaneously, sounds are output, in accordance with the display position of the virtual object OBJ displayed on the display screen of the display section 35. FIG. 5 is a diagram illustrating an example of a vibration imparted to the left side of the main body of the information processing apparatus 3 in the exemplary game. FIG. 6 is a diagram illustrating an example of a vibration imparted to the right side of the main body of the information processing apparatus 3 in the exemplary game. FIG. 7 is a diagram illustrating an example of a left sound output from the sound output apparatus 4 in the exemplary game. FIG. 8 is a diagram illustrating an example of a right sound output from the sound output apparatus 4 in the exemplary game. FIG. 9 is a diagram illustrating an example of the spectrum of a vibration imparted to the left side of the main body of the information processing apparatus 3 in the exemplary game. FIG. 10 is a diagram illustrating an example of the spectrum of a vibration imparted to the right side of the main body of the information processing apparatus 3 in the exemplary game. FIG. 11 is a diagram illustrating an example of the spectrum of a left sound output from the information processing apparatus 3 in the exemplary game. FIG. 12 is a diagram illustrating an example of the spectrum of a right sound output from the information processing apparatus 3 in the exemplary game. FIG. 13 is a diagram showing an example of the relationship between the localization position of sounds and the position to be perceived by the user as a vibration source.

In the example shown in FIG. 4, a virtual object OBJ moving in a virtual space is displayed on the display screen of the display section 35. The virtual object OBJ is displayed on the display screen of the display section 35 so as to move in the virtual space in accordance with a user operation or automatically. In the example shown in FIG. 4, in the virtual space displayed on the display screen of the display section 35, the virtual object OBJ placed on the far side of the display screen is moving from left to right.

In accordance with the movement of the virtual object OBJ, the main body of the information processing apparatus 3 vibrates, and simultaneously, sounds are output. For example, from left and right loudspeakers provided in headphones, which are an example of the sound output apparatus 4, sounds corresponding to the movement of the virtual object OBJ are being output so that the sounds are localized at a position in real space on the other side (far side), as viewed from a user, across the information processing apparatus 3 held by the user. Typically, the position where the sounds are localized (a sound source localization position) is a position in real space on a straight line passing through the virtual object OBJ displayed on the display screen of the display section 35 and on the other side (far side) of the display screen, as viewed from the user. As described above, the display position of the virtual object OBJ and the sound source localization position of sounds corresponding to the virtual object OBJ are substantially matched together. This can provide a realistic experience using visual sensation and auditory sense to the user.

In addition, in accordance with the display position of the virtual object OBJ displayed on the display screen of the display section 35, the left actuator 373L and the right actuator 373R, which are provided in the main body of the information processing apparatus 3, generate vibrations to occur when the virtual object OBJ moves. As an example, with the use of phantom sensation that stimulates two different points in the user's skin (specifically, the left hand and the right hand of the user holding the main body of the information processing apparatus 3) to cause the user to perceive a pseudo stimulus at one point, the left actuator 373L and the right actuator 373R impart, to the user of the information processing apparatus 3, vibrations for causing the user to perceive the display position of the virtual object OBJ as the localization position of the vibrations in a pseudo manner (vibrations for causing the display position of the virtual object OBJ to be the position where a pseudo force sense is presented).

For example, as shown in FIGS. 5 and 6, vibrations different from each other are imparted by the left actuator 373L and the right actuator 373R to the main body of the information processing apparatus 3, thereby achieving the above phantom sensation. For example, control is performed so that the amplitude of the vibration to be imparted by the left actuator 373L to the main body of the information processing apparatus 3 (a vibration signal (left); for example, indicating a driving signal for driving the left actuator 373L or a left analog vibration signal) is smaller than the amplitude of the vibration to be imparted by the right actuator 373R to the main body of the information processing apparatus 3 (a vibration signal (right); for example, indicating a driving signal for driving the right actuator 373R or a right analog vibration signal). This makes the vibration to be imparted from the right side stronger than the vibration to be imparted from the left side. This enables the user to perceive a position on the right of the display screen of the display section 35 as the vibration source.

When such vibrations are being imparted to the user of the information processing apparatus 3, from the left and right loudspeakers provided in the headphones, which are an example of the sound output apparatus 4, sounds corresponding to the vibrations and localized at a position in real space on the other side (far side), as viewed from the user, across the information processing apparatus 3 held by the user are being output. For example, as shown in FIGS. 7 and 8, sounds are output such that the position where the sounds are localized (the sound source localization position) is a position in real space on the other side (far side) of the display screen and also a position on the right. As described above, the display position of the virtual object OBJ, the vibration source position corresponding to the virtual object OBJ, and the sound source localization position of sounds corresponding to the virtual object OBJ are placed based on positional relationships described later, thereby substantially matching these positions. This can provide a realistic experience using visual sensation, auditory sense, and tactile sensation to the user.

In addition, control is performed so that the amplitude of the vibration to be imparted by the right actuator 373R to the main body of the information processing apparatus 3 is smaller than amplitude of the vibration to be imparted by the left actuator 373L to the main body of the information processing apparatus 3. Thus, the vibration to be imparted from the left side is made stronger than the vibration to be imparted from the right side, whereby it is possible to cause the user to perceive as the vibration source a position on the left of the display screen of the display section 35. In this case, from the left and right loudspeakers of the sound output apparatus 4, sounds corresponding to the vibrations and localized at a position in real space on the other side (far side), as viewed from the user, across the information processing apparatus 3 held by the user and also a position on the left are output.

Further, as shown in FIGS. 9 and 10, each of the left actuator 373L and the right actuator 373R may impart a vibration having a plurality of frequency components (a vibration having not only a single frequency component) to the main body of the information processing apparatus 3. For example, FIGS. 9 and 10 show examples of the spectra of the vibrations imparted to the main body of the information processing apparatus 3 at a certain point in time and indicate that a vibration in a frequency range having a predetermined width (a vibration in a wide band) is imparted by each of the left actuator 373L and the right actuator 373R to the main body of the information processing apparatus 3. More specifically, a vibration having power in the entire area of the frequency range from a frequency component lower than 10 Hz (hertz) to a frequency component higher than 1 kHz (kilohertz) is imparted by each of the left actuator 373L and the right actuator 373R to the main body of the information processing apparatus 3. Here, the sensory receptors of a human being for receiving cutaneous sensation include Merkel discs, Meissner corpuscles, Pacinian corpuscles, Ruffini endings, and the like. The Merkel discs are regarded as responding to vibrations at 0 to 200 Hz. The Meissner corpuscles are regarded as responding to vibrations at 20 to 100 Hz and regarded as having the highest sensitivity to vibrations near 30 Hz. The Pacinian corpuscles are regarded as responding to vibrations at 100 to 300 Hz and regarded as having the highest sensitivity to vibrations near 200 Hz. The vibrations imparted by the left actuator 373L and the right actuator 373R to the main body of the information processing apparatus 3 include vibrations in the frequency range of 0 to 1 kHz, which is regarded as being able to be felt by a human being or include part of vibrations in this frequency range, and also include frequency components to which these sensory receptors can respond (frequency components in areas A to C shown in FIGS. 9 and 10). This makes it possible to reproduce a touch rich in reality and present the touch to the user.

In addition, as shown in FIGS. 9 to 12, vibrations that can be imparted to the user of the information processing apparatus 3 and sounds that are output from the information processing apparatus 3 can have different spectra. For example, the information processing apparatus 3 can impart, to the user, vibrations around a wide band of 0 to 1000 Hz, which is regarded as being able to be felt by a human being, and can also output sounds around a wide band of 20 to 20000 Hz, which include audio frequencies audible to the human ear. Thus, the vibrations and the sounds can have different spectra by controlling different vibrators (the left actuator 373L, the right actuator 373R, and the loudspeakers of the sound output apparatus 4) by different control signals.

Here, as shown in FIG. 13, if the position of the user, the localization position of the vibrations, and the localization position of the sounds lie on a straight line in real space, the localization position of the vibrations shifts to the localization position of the sounds. For example, as described above, the localization position of the vibrations (the vibration source) on the display screen perceived in a pseudo manner shifts to the localization position of the sounds (the sound sources) output from the sound output apparatus 4 and is perceived. Thus, the left actuator 373L and the right actuator 373R are vibrated, thereby causing the user holding the information processing apparatus 3 to perceive the localization position of the sounds as vibrating as the vibration source. Specifically, the timing to output sounds to be localized at the localization position of the sounds is matched with the timing to generate vibrations to be localized at the localization position of the vibrations, and simultaneously, both senses of localization are made clear. Thus, the localization position of the vibrations described above shifts to the localization position of the sounds. By such a technique, the position to be perceived by the user as the vibration source can be expanded not only to between the left actuator 373L and the right actuator 373R but also to the space where the sounds can be localized. It should be noted that using 3D audio effect technology described later, it is possible to localize sounds in front and rear, left and right, and up and down directions with respect to the user. Thus, the position to be perceived by the user as the vibration source can be similarly localized in the space expanded in front and rear, left and right, and up and down directions with respect to the user. The phenomenon that the position to be perceived by the user as the vibration source thus shifts to the localization position of the sounds is likely to occur in an environment where the user is caused to perceive the presence of the localization position of the vibrations between a plurality of actuators (i.e., the left actuator 373L and the right actuator 373R) in a pseudo manner. The combination of vibration control using the plurality of actuators and the localization position of the sounds results in a more suitable operation environment.

As an example, if the left actuator 373L and the right actuator 373R have been vibrated with certain vibration intensities, and then, the vibration intensities have been made smaller, the user of the information processing apparatus 3 cannot distinguish whether the vibration source has shifted away or the intensities of the vibrations generated by the vibration source have merely become smaller. In such a case, control is performed so that in accordance with the fact that the vibration intensities are made smaller, the sound source localization position shifts away from the user. This enables the user of the information processing apparatus 3 to distinguish that the vibration source has shifted away. On the other hand, control is performed so that the vibration intensities are made smaller with the sound source localization position fixed. This enables the user of the information processing apparatus 3 to distinguish that the vibrations per se generated by the vibration source have become smaller. Further, the virtual object OBJ is placed at the above position corresponding to the sound source localization position when displayed, thereby making the above distinction easier.

It should be noted that the position of the user, the localization position of the vibrations, and the localization position of the sounds lie on a straight line in real space, whereby it is possible to shift the localization position of the vibrations to be perceived by the user to the localization position of the sounds. The positional relationships, however, may be such that these positions do not lie on a straight line. For example, the position to be perceived by the user as the localization position of the sounds and the position to be perceived by the user as the localization position of the vibrations may have individual differences between users. Further, even if these positions do not lie exactly on a straight line, the user can perceive the sounds and the vibrations as being generated from the same position so long as the localization position of the vibrations and the localization position of the sounds are in the same direction to some extent, as viewed from the user. That is, vibrations of which the vibration source is perceived in a predetermined range around the direction of the localization of sounds are imparted by the left actuator 373L and the right actuator 373R to the main body of the information processing apparatus 3, whereby it is possible to shift the localization position of the vibrations to be perceived by the user to the localization position of the sounds. Further, vibrations and sounds representing the presence of the virtual object OBJ displayed on the display screen of the display section 35 (e.g., vibrations and movement sounds when the virtual object OBJ moves) are output, whereby it is also possible to cause the user to clearly perceive the display position of the virtual object OBJ as being matched with the position where the sounds are localized and the position where the vibrations are localized.

As described above, the user is caused to perceive the display position of the virtual object OBJ, the localization position of the sounds, and the localization position of the vibrations as being substantially matched together, whereby it is possible to provide a realistic experience using visual sensation, auditory sense, and tactile sensation to the user. Further, vibrations and sounds indicating the presence of the virtual object OBJ (e.g., vibrations and movement sounds when the virtual object OBJ moves) are imitated to generate vibrations to be imparted by the left actuator 373L and the right actuator 373R and sounds to be output from the sound output apparatus 4. This can further enhance the reality.

Next, in the exemplary embodiment, sounds to be output from the sound output apparatus 4 are described. In the exemplary embodiment, to provide a sense of clear localization of sounds to the user who listens to sounds from the sound output apparatus 4, sounds using 3D audio effect technology are output from the sound output apparatus 4. For example, sounds generated by a binaural method enable the user listening to the sound to recognize the spatial directions of the sounds and the distances from the sounds.

The binaural method, which is one type of 3D audio effect technology, uses the transfer characteristics (a head-related transfer function) of sounds from the sound sources to both ears of a listener, thereby causing the listener to recognize the directions from which the sounds come and the distances from the sound sources. For example, if a person listens to sounds, the sound pressure levels (gains) change in accordance with frequencies until the sounds reach the eardrums from the sound sources, and these frequency characteristics are set as a head-related transfer function. That is, the head-related transfer function is a transfer function taking into account not only direct sounds coming directly to the eardrums of the listener, but also the influences of sounds diffracted and reflected by the earlobes, the head, and the body parts of the listener. Further, the frequency characteristics exhibit characteristics that vary depending on the locations (the azimuth orientations) where the sound sources are placed. Further, regarding the frequency characteristics of sounds from sound sources placed in certain azimuth orientations, the frequency characteristics of the sound to be detected by the left ear and the frequency characteristics of the sound to be detected by the right ear are different characteristics. That is, the frequency characteristics of, the sound volumes of, and the time difference between, the sounds to reach the left and right eardrums of the listener are controlled, whereby it is possible to control the locations (the azimuth orientations) of the sound sources to be perceived by the listener. In the exemplary embodiment, such a head-related transfer functions is used, thereby simulating 3D audio effects to generate sounds to be output from the sound output apparatus 4.

It should be noted that sounds may be generated based on a function for assuming and calculating sounds that come from the sound sources to the left ear and the right ear of the user at a predetermined listening position. Alternatively, sounds may be generated using a function other than the head-related transfer function, thereby providing a sense of localization of sounds to the user listening to the sounds. For example, 3D audio effects may be simulated using another method for obtaining effects similar to those of the binaural method, such as a holophonics method or an otophonics method. Further, in the 3D audio effect technology using the head-related transfer function in the above exemplary embodiment, the sound pressure levels are controlled in accordance with frequencies until the sounds reach the eardrums from the sound sources, and the sound pressure levels are controlled also based on the locations (the azimuth orientations) where the sound sources are placed. Alternatively, sounds may be generated using either one type of control. That is, sounds to be output from the sound output apparatus 4 may be generated using only a function for controlling the sound pressure levels in accordance with frequencies until the sounds reach the eardrums from the sound sources, or sounds to be output from the sound output apparatus 4 may be generated using only a function for controlling the sound pressure levels also based on the locations (the azimuth orientations) where the sound sources are placed. Yet alternatively, sounds to be output from the sound output apparatus 4 may be generated using, as well as these functions, only a function for controlling the sound pressure levels using at least one of the difference in sound volume, the difference in transfer time, the change in the phase, the change in the reverberation, and the like corresponding to the locations (the azimuth orientations) where the sound sources are placed. Yet alternatively, as an example where a function other than the head-related transfer function is used, 3D audio effects may be simulated using a function for changing the sound pressure levels in accordance with the distances from the positions where the sound sources are placed to the user. Yet alternatively, 3D audio effects may be simulated using a function for changing the sound pressure levels in accordance with at least one of the atmospheric pressure, the humidity, the temperature, and the like in real space where the user is operating the information processing apparatus 3.

In addition, even if the binaural method is used, sounds to be output from the sound output apparatus 4 may be generated using peripheral sounds recorded through microphones built into a dummy head representing the head of a listener, or microphones attached to the inside of the ears of a person. In this case, the states of sounds reaching the eardrums of the listener are recorded using structures similar to those of the skull and the auditory organs of the listener, or the skull and the auditory organs per se, whereby it is possible to similarly provide a sense of localization of sounds to the user listening to the sounds.

In addition, the sound output apparatus 4 may not be headphones or earphones for outputting sounds directly to the ears of the user, and may be stationary loudspeakers for outputting sounds to real space. For example, if stationary loudspeakers are used as the sound output apparatus 4, a plurality of loudspeakers can be placed in front of or around the user, and sounds can be output from the respective loudspeakers. As a first example, if a pair of loudspeakers (so-called two-channel loudspeakers) is placed in front of and on the left and right of the user, sounds generated by a general stereo method can be output from the loudspeakers. As a second example, if five loudspeakers (so-called five-channel loudspeakers) are placed in front and back of and on the left and right of the user, stereo sounds generated by a surround method can be output from the loudspeakers. As a third example, if multiple loudspeakers (e.g., 22.2 multi-channel loudspeakers) are placed in front and back of, on the left and right of, and above and below the user, stereo sounds using a multi-channel acoustic system can be output from the loudspeakers. As a fourth example, sounds generated by the above binaural method can be output from the loudspeakers using binaural loudspeakers. In any of the examples, sounds can be localized in front and back of, on the left and right of, and/or above and below the user. This makes it possible to shift the localization position of the vibrations using the localization position of the sounds.

In addition, the sound output apparatus 4 may be a single loudspeaker. For example, even if a loudspeaker for outputting a monaural sound is placed in front of the user, it is possible to set the position of the loudspeaker at the localization position of the sound. This makes it possible to shift the localization position of the vibrations using the localization position of the sound. Further, even if a single vibration actuator is included in the information processing apparatus 3, it is possible to achieve the exemplary embodiment. For example, the localization position of a sound is set in real space on an extension line connecting the user to the single vibration actuator. This also enables the user to perceive a vibration obtained from the vibration actuator as being generated from the localization position of the sound.

In addition, in the exemplary embodiment, vibration data for imparting vibrations to the main body of the information processing apparatus 3 and sound data for outputting sounds from the information processing apparatus 3 may be prepared separately in advance. In this case, vibration data corresponding to the type of vibrations to be imparted to the main body of the information processing apparatus 3 is extracted and read from the prepared vibration data, thereby generating vibration control signals. Further, sound data corresponding to sounds to be output from the information processing apparatus 3 is extracted and read from the prepared sound data, thereby generating sound control signals. It should be noted that in the vibration data, vibration data for imparting a vibration from the left actuator 373L and vibration data for imparting a vibration from the right actuator 373R may be prepared separately. As an example, a pair of left and right pieces of vibration data may be prepared in advance based on the position of the vibration source. Then, when vibrations are imparted to the main body of the information processing apparatus 3, a pair of left and right pieces of vibration data corresponding to the position to be perceived by the user as the vibration source may be read. Further, it goes without saying that also in the sound data, sound data for outputting a sound from the left loudspeaker and sound data for outputting a sound from the right loudspeaker may be prepared separately. Further, sound data prepared in advance may be used as vibration data. Sound data is also data used to vibrate and drive a diaphragm of a loudspeaker and therefore can be used as data for vibrating and driving a vibrator (i.e., vibration data).

In addition, in the exemplary embodiment, a vibration control signal (the left vibration control signal CSL) for driving the left actuator 373L and a vibration control signal (the right vibration control signal CSR) for driving the right actuator 373R may be generated independently of each other, or may be generated by processing a single vibration control signal. For example, in the second case, a single vibration control signal prepared in advance in accordance with the intensity of the vibration for vibrating each actuator can be processed, thereby generating the left vibration control signal CSL and the right vibration control signal CSR.

In addition, in the above exemplary game, the position to be perceived by the user as the vibration source can be set in accordance with the position of the virtual object OBJ moving in the virtual space. Alternatively, the position to be perceived by the user as the vibration source in the exemplary embodiment does not need to be the position of an image displayed so as to move. For example, the vibrations to be imparted by the left actuator 373L and the right actuator 373R may be controlled so that a virtual object fixedly displayed on the display screen of the display section 35 is the vibration source. Further, if an image obtained by capturing the real world is displayed on the display screen of the display section 35, the vibrations to be imparted by the left actuator 373L and the right actuator 373R may be controlled so that the position of a captured object in the real world that appears in the image is the vibration source and the sound source.

In addition, as described above, if the localization position of the vibrations is shifted to the localization position of the sounds, the intensities of the vibrations to be imparted to the information processing apparatus 3 may be changed in accordance with the distance from the user or the information processing apparatus 3 to the localization position of the sounds. As an example, if the localization position of the sounds to be output from the sound output apparatus 4 shifts so as to come close to the user from a distant place, the intensities of the vibrations to be imparted to the information processing apparatus 3 may be increased in accordance with the shift of the localization position of the sounds.

Figure 14:
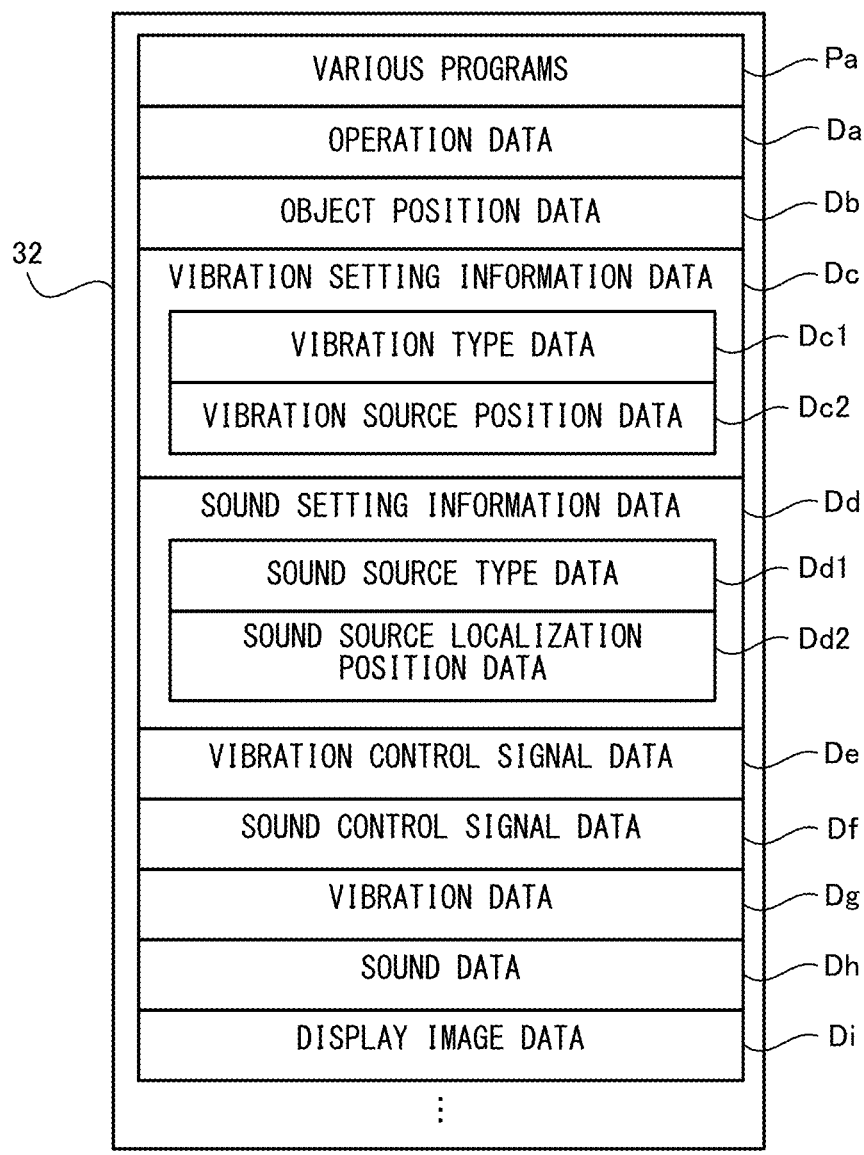
FIG. 14 is a diagram showing non-limiting examples of main data and programs stored in a storage section 32 of the information processing apparatus 3.

Next, a detailed description is given of the processing performed by the information processing apparatus 3. First, with reference to FIG. 14, main data used in the processing is described. FIG. 14 is a diagram showing examples of main data and programs stored in the storage section 32 of the information processing apparatus 3. It should be noted that in the following exemplary processing, a description is given using the information processing when the game processing of the above exemplary game is performed.

As shown in FIG. 14, the following are stored in the data storage area of the storage section 32: operation data Da; object position data Db; vibration setting information data Dc; sound setting information data Dd; vibration control signal data De; sound control signal data Df; vibration data Dg; sound data Dh; display image data Di; and the like. It should be noted that the storage section 32 may store, as well as the data shown in FIG. 14, data and the like necessary for the processing, such as data used in an application to be executed. Further, in the program storage area of the storage section 32, various programs Pa included in the information processing program are stored. For example, the various programs Pa include a vibration generation program for generating vibration control signals to impart vibrations to the information processing apparatus 3, a sound generation program for generating sound control signals to output sounds from the information processing apparatus 3, an image display program for displaying an image on the display section 35, and the like.

The operation data Da is data representing the content of the operation performed on the input section 34 and includes, for example, data representing the touch position of a touch operation on the touch panel 341. It should be noted that if the input section 34 includes a sensor for detecting the orientation and the motion of the main body of the information processing apparatus 3, the operation data Da may include data for calculating the orientation and the motion of the main body of the information processing apparatus 3 (e.g., data representing the acceleration generated in the main body of the information processing apparatus 3 and data representing the angular velocity of the main body of the information processing apparatus 3).

The object position data Db is data representing the position of a virtual object OBJ moving in a virtual space (see FIG. 4).

The vibration setting information data Dc includes vibration type data Dc1, vibration source position data Dc2, and the like. The vibration type data Dc1 is data representing the type of vibrations to be imparted to the information processing apparatus 3. The vibration source position data Dc2 is data representing the position to be perceived as the vibration source by the user of the information processing apparatus 3 (the position before the shift to the above localization position of the sounds).

The sound setting information data Dd includes sound source type data Dd1, sound source localization position data Dd2, and the like. The sound source type data Dd1 is data representing the type of sounds to be output from the sound output apparatus 4. The sound source localization position data Dd2 is data representing the sound source localization position of sounds to be output from the sound output apparatus 4.

The vibration control signal data De is data representing vibration control signals to be output from the control section 31 to the vibration generation section 37 (the left vibration control signal CSL and the right vibration control signal CSR; see FIG. 3). The sound control signal data Df is data representing sound control signals to be output from the control section 31 to the sound signal conversion section 36 (the left sound control signal and the right sound control signal).

The vibration data Dg is data prepared in advance for generating vibration control signals and is stored for each type of vibration to be imparted to the main body of the information processing apparatus 3 (e.g., for each virtual object for which vibrations are generated). The sound data Dh is data prepared in advance for generating sound control signals and is stored for each type of sound to be output from the information processing apparatus 3 (e.g., for each virtual object for which sounds are produced or each type of BGM). Here, the sound data Dh is sound data that provides a sense of localization of sounds to the user listening to the sound from the sound output apparatus 4, and corresponds to sounds using the above 3D audio effect technology.

The display image data Di is data for generating an image of each virtual object such as the virtual object OBJ, a background image, and the like and displaying the generated images on the display section 35.

Figure 15:
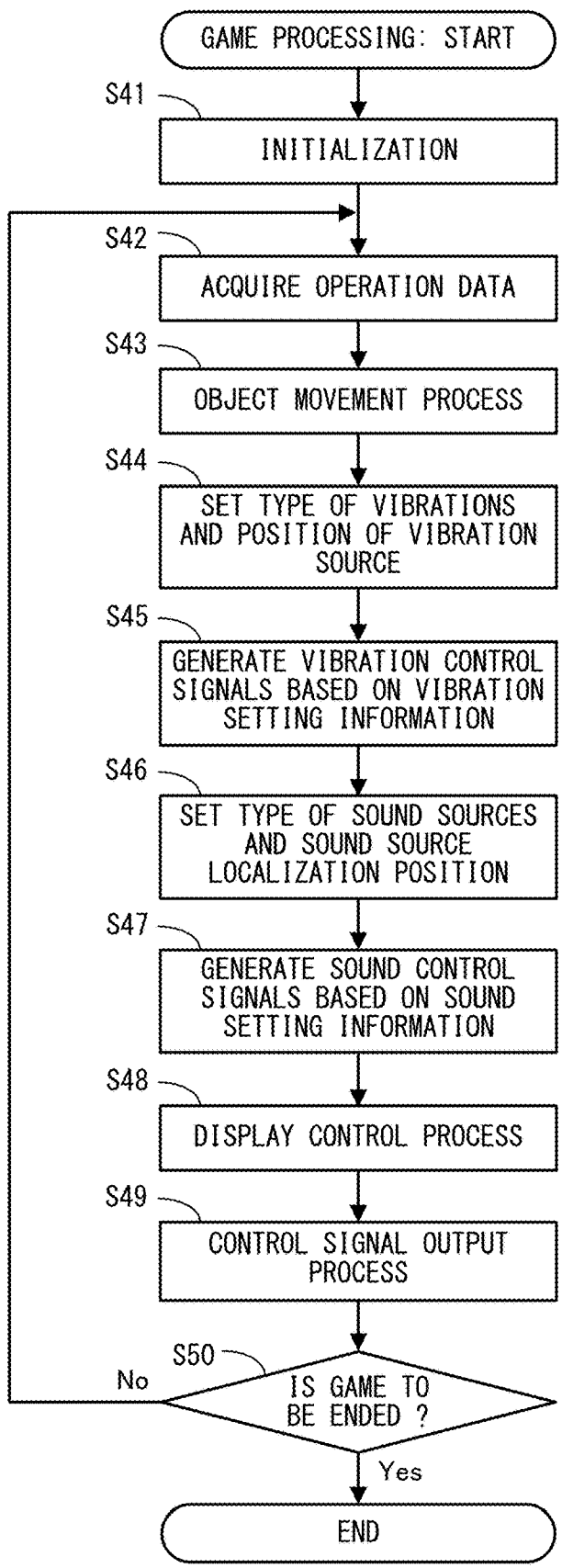
FIG. 15 is a flow chart showing a non-limiting example of game processing performed by the information processing apparatus 3.

Next, with reference to FIG. 15, a detailed description is given of the game processing, which is an example of the information processing performed by the information processing apparatus 3. It should be noted that FIG. 15 is a flow chart showing an example of the game processing performed by the information processing apparatus 3. Here, in the flow chart shown in FIG. 15, a description is given mainly of, in the processing performed by the information processing apparatus 3, the process of outputting vibrations and sounds corresponding to the movement of the virtual object OBJ in the virtual space in the above exemplary game. The detailed descriptions of other processes not directly related to these processes are omitted. Further, in FIG. 15, all of the steps performed by the control section 31 are abbreviated as "S".

The CPU of the control section 31 initializes a memory and the like of the storage section 32 and loads the information processing program from the program storage section 33 into the memory. Then, the CPU starts the execution of the information processing program. The flow chart shown in FIG. 15 is a flow chart showing the processing performed after the above processes are completed.

It should be noted that the processes of all of the steps in the flow chart shown in FIG. 15 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section 31 (the CPU) performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 15, the control section 31 performs initialization (step 41), and proceeds to the next step. For example, the control section 31 constructs a virtual space to be displayed on the display section 35 and initializes parameters. As an example, the control section 31 places the virtual object OBJ at an initial position in the virtual space and sets the object position data Db. Further, the control section 31 sets the display range to be displayed on the display screen of the display section 35 for the virtual space.

Next, the control section 31 acquires operation data from the input section 34 and updates the operation data Da (step 42), and the processing proceeds to the next step.

Next, the control section 31 performs the process of causing the virtual object OBJ to move in the virtual space (step 43), and the processing proceeds to the next step. For example, the control section 31 causes the virtual object OBJ to move at a moving speed determined in advance along a movement path determined in advance in the virtual space and updates the object position data Db using the position of the virtual object OBJ after the movement. As another example, if the control section 31 causes the virtual object OBJ to move in accordance with an operation on the input section 34 (including the operation of moving or tilting the main body of the information processing apparatus 3), the control section 31 causes the virtual object OBJ to move in the virtual space in accordance with the operation data acquired in the above step 42 and updates the object position data Db using the position of the virtual object OBJ after the movement.

Next, the control section 31 sets the type of vibrations and the position of the vibration source (step 44), and the processing proceeds to the next step. For example, based on the vibration generation program and the type of the virtual object OBJ placed in the virtual space, the control section 31 sets the type of vibrations when the virtual object OBJ moves. Then, the control section 31 updates the vibration type data Dc1 using data representing the type of vibrations. Further, based on the vibration generation program, the control section 31 sets the position of the vibration source such that the display position of the virtual object OBJ placed at the position indicated by the object position data Db (i.e., the position on the display screen of the display section 35) is perceived as the vibration source by the user. Then, the control section 31 updates the vibration source position data Dc2 using data representing the set position.

Next, based on vibration setting information, the control section 31 sets vibration control signals (step 45), and the processing proceeds to the next step. For example, based on the vibration generation program and the vibration setting information data Dc (the vibration type data Dc1 and the vibration source position data Dc2), the control section 31 generates vibration control signals (the left vibration control signal CSL and the right vibration control signal CSR to be output to the vibration generation section 37; see FIG. 3) using vibration data read from the vibration data Dg and stores the vibration control signals in the vibration control signal data De. Specifically, the control section 31 reads data from the vibration data Dg and generates the left vibration control signal CSL and the right vibration control signal CSR corresponding to the vibrations of the type indicated by the vibration type data Dc1, so that the vibrations of the type indicated by the vibration type data Dc1 are imparted to the main body of the information processing apparatus 3, and the position indicated by the vibration source position data Dc2 (e.g., the position on the display screen of the display section 35) is the position of the vibration source before shifting to the localization position of the sounds.

Next, the control section 31 sets the type of sound sources and the position where the sound sources are localized (step 46), and the processing proceeds to the next step. For example, based on the sound generation program and the type of the virtual object OBJ placed in the virtual space, the control section 31 sets the type of sounds when the virtual object OBJ moves. Then, the control section 31 updates the sound source type data Dd1 using data representing the type of sounds. Further, based on the sound generation program, the control section 31 sets the sound source localization position such that a position in real space corresponding to the position, in the virtual space, of the virtual object OBJ indicated by the object position data Db (e.g., a position in real space on a straight line passing through the display position of the virtual object OBJ and on the other side (far side) of the display screen of the display section 35) is the sound source localization position of the sounds. Then, the control section 31 updates the sound source localization position data Dd2 using data representing the sound source localization position. The sound source localization position is thus set, whereby the user, the position of the vibration source, and the sound source localization position lie almost on a straight line in real space, and the display position of the virtual object OBJ also lies on the straight line.

Next, based on sound setting information, the control section 31 sets sound control signals (step 47), and the processing proceeds to the next step. For example, based on the sound generation program and the sound setting information data Dd (the sound source type data Dd1 and the sound source localization position data Dd2), the control section 31 generates sound control signals (the left sound control signal and the right sound control signal to be output to the sound signal conversion section 36) and stores the sound control signals in the sound control signal data Df. Specifically, the control section 31 processes data read from the sound data Dh to generate the left sound control signal and the right sound control signal, so that the sounds of the type indicated by the sound source type data Dd1 are output from the sound output apparatus 4, and the position indicated by the sound source localization position data Dd2 is the sound source localization position.

Next, the control section 31 performs a display control process (step 48), and the processing proceeds to the next step. For example, based on an image generation program and the object position data Db, the control section 31 performs the process of generating an image of the virtual space in which the virtual object OBJ is placed, and displaying on the display section 35 the image of the virtual space in the set display range.

Next, the control section 31 performs a control signal output process (step 49), and the processing proceeds to the next step. For example, the control section 31 outputs to the vibration generation section 37 the left vibration control signal CSL and the right vibration control signal CSR indicated by the vibration control signal data De. Consequently, the vibration generation section 37 generates a vibration corresponding to the left vibration control signal CSL from the left actuator 373L and generates a vibration corresponding to the right vibration control signal CSR from the right actuator 373R. Further, the control section 31 outputs to the sound signal conversion section 36 the left sound control signal and the right sound control signal indicated by the sound control signal data DE Consequently, the sound signal conversion section 36 performs D/A conversion on, and amplifies, the left sound control signal and the right sound control signal, outputs a sound corresponding to the left sound control signal from the left loudspeaker of the sound output apparatus 4, and outputs a sound corresponding to the right sound control signal from the right loudspeaker of the sound output apparatus 4. The sounds thus localized at the sound source localization position are output, thereby causing the user to perceive the vibration source, placed at a position on a straight line connecting the user to the sound source localization position, as having shifted to the sound source localization position. This enables the user to perceive the sound source localization position and the vibration localization position as being matched together.

Next, the control section 31 determines whether or not the game processing is to be ended (step 50). Examples of conditions for ending the game processing include: the satisfaction of the condition under which the game processing is ended; and the fact that the user has performed the operation of ending the game processing. If the game processing is not to be ended, the control section 31 returns to the above step 42 and repeats the process thereof. If the game processing is to be ended, the control section 31 ends the processing indicated by the flow chart.

As described above, in the game processing according to the above exemplary embodiment, vibrations in a wide band imparted by the left actuator 373L and the right actuator 373R are imparted to the information processing apparatus 3, whereby it is possible to impart vibrations rich in variety to the user. Further, the position to be perceived by the user as the vibration source can be expanded not only to between the left actuator 373L and the right actuator 373R but also to the space where the sounds can be localized. This enables the user to perceive unconventional vibrations.

It should be noted that the above descriptions are given using the example where the information processing apparatus 3 performs information processing (game processing). Alternatively, another apparatus may perform at least some of the processing steps in the information processing. For example, if the information processing apparatus 3 is further configured to communicate with another apparatus (e.g., another server, another game apparatus, or another mobile terminal), the other apparatus may cooperate to perform the processing steps of the information processing. As an example, another apparatus may perform at least one of the virtual space image generation process, the vibration control signal generation process, and the sound control signal generation process, and the information processing apparatus 3 may acquire image data and control signals indicating the result of the process. Another apparatus may thus perform at least some of the processing steps in the information processing, thereby enabling processing similar to the above information processing. Further, the above information processing can be performed by a processor or the cooperation of a plurality of processors, the processor or the plurality of processors included in an information processing system including at least one information processing apparatus. Further, in the above exemplary embodiment, the processing indicated in the above flow chart is performed by the control section 31 of the information processing apparatus 3 executing a predetermined game program. Alternatively, a part or all of the information processing indicated in the flow chart may be performed by a dedicated circuit included in the information processing apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the information processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the above information processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. As an example, three or more actuators may impart vibrations to the information processing apparatus. Alternatively, the information processing apparatus may include a plurality of display sections. Further, in the above description, a mobile apparatus (e.g., a tablet terminal) has been used as an example of the information processing apparatus 3. Alternatively, the information processing apparatus 3 may be a handheld apparatus or a portable apparatus larger than a mobile apparatus. Here, a handheld apparatus is an apparatus that can be operated by the user holding it in their hands, and is a concept including the above mobile apparatus. Further, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above handheld apparatus and mobile apparatus.

In addition, a system for imparting vibrations to the user without holding or wearing a device may be used. For example, using a system for emitting ultrasonic waves to the skin of the user to cause the user to perceive vibrations (e.g., airborne ultrasonic tactile display), the user may be caused to perceive the vibration source, and sounds to be localized at a predetermined sound source localization position are imparted to the user, thereby achieving the above information processing. In this case, it is possible to achieve the exemplary embodiment even without a mobile apparatus such as the information processing apparatus 3.

In addition, the information processing program may be supplied to the information processing apparatus 3 not only through an external storage medium such as the external memory 45, but also through a wired or wireless communication link. Further, the information processing program may be stored in advance in a non-volatile storage device included in the information processing apparatus 3. It should be noted that examples of an information storage medium having stored therein the information processing program may include CD-ROMs, DVDs, optical disk storage media similar to these, flexible disks, hard disks, magneto-optical disks, and magnetic tapes, as well as non-volatile memories. Alternatively, an information storage medium having stored therein the information processing program may be a volatile memory for storing the information processing program. It can be said that such a storage medium is a storage medium readable by a computer or the like. For example, it is possible to provide the above various functions by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing system, an information processing apparatus, an information processing program, an information processing method, and the like in order, for example, to cause a user to perceive unconventional vibrations.

What is claimed is:

1. A system comprising one or more speakers and an information processing apparatus in communication with the speakers, wherein the information processing apparatus comprises:
a hand-holdable housing;
a display disposed on the front surface of the housing;
first and second spaced apart vibrators disposed in the housing; and
a processor configured to:
control the display to display, based on inputs to the information processing apparatus, an image of a virtual space, the image of the virtual space including an object;
generate, based on a sound source in the virtual space, sound signals for use in outputting, via the speakers, sound for user perception as being localized at a sound localization position in real space outside the housing of the information processing apparatus, the sound localization position being based on a position at which the object is displayed on the display; and
generate, based on a vibration source in the virtual space, vibration signals for controlling the first and second vibrators to generate vibration of the housing that is localized to remain on a straight line in real space with a user position and the sound localization position as the object changes position on the display, thereby causing user perception of the generated vibration as being localized at a vibration localization position which is the same as the sound localization position to continue as the sound localization position shifts based on the changing position of the object.

2. The information processing system according to claim 1, wherein
the processor is configured to generate the vibration signals for changing an intensity of the vibration generated by the first and second vibrators in accordance with the sound localization position.

3. The information processing system according to claim 1, wherein
the processor is configured to generate vibration signals for changing proportions of intensities of the vibration generated by the first and second vibrators.

4. The information processing system according to claim 1, wherein
the processor is configured to generate the sound signals based on a function for calculating sound from the sound source to each of a left ear and a right ear.

5. The information processing system according to claim 4, wherein
the function is based on a sound pressure level characteristic corresponding to a frequency.

6. The information processing system according to claim 4, wherein
the function is based on a sound pressure level characteristic corresponding to a direction of the sound source.

7. The information processing system according to claim 4, wherein
the function is a head-related transfer function.

8. The information processing system according to claim 1, wherein
the processor is configured to generate the sound signals using data in which sound from the sound source to each of a left ear and a right ear is recorded.

9. The information processing system according to claim 1, wherein
the processor is configured to generate the vibration signals for changing an intensity of the vibration generated by the first and second vibrators in accordance with a distance from the sound localization position.

10. The information processing system according to claim 1, wherein
the one or more speakers are included in headphones.

11. The system according to claim 1, wherein the one or more speakers is in wireless communication with the information processing apparatus.

12. The system according to claim 1, wherein the one or more speakers is in wired communication with the information processing apparatus.

13. The system according to claim 1, further comprising:
a sensor configured to sense aspects of orientation and/or motion of the information processing apparatus.

14. An information processing apparatus comprising:
a hand-holdable housing;
a display disposed on a front surface of the housing;
first and second spaced apart vibrators disposed in the housing; and
a processor configured to:
control the display to display, based on inputs to the information processing apparatus, an image of a virtual space, the image of the virtual space including an object;
generate, based on a sound source in the virtual space, sound signals for use in outputting, via speakers in communication with the information processing apparatus, sound for user perception as being localized at a sound source localization position in real space outside the housing of the information processing apparatus, the sound localization position being based on a position at which the object is displayed on the display; and
generate, based on a vibration source in the virtual space, vibration signals for controlling the first and second vibrators to generate vibration of the housing that is localized to remain on a straight line in real space with a user position and the sound localization position as the object changes position on the display, thereby causing user perception of the generated vibration as being localized at a vibration localization position which is the same as the sound localization position to continue as the sound localization position shifts based on the changing position of the object.

15. A non-transitory computer-readable storage medium having stored therein an information processing program for execution by a processor included in an information processing apparatus comprising a hand-holdable housing; a display disposed on a front surface of the housing; and first and second spaced apart vibrators disposed in the housing,
the information processing program, when executed, causing the processor to control the information processing apparatus to operations comprising:
control the display to display, based on inputs to the information processing apparatus, an image of a virtual space, the image of the virtual space including an object;
generating, based on a sound source in the virtual space, sound signals for use in outputting, via speakers in communication with the information processing apparatus, sound for user perception as being localized at a sound localization position in real space outside the housing of the information processing apparatus, the sound localization position being based on a position at which the object is displayed on the display; and
generating, based on a vibration source in the virtual space, vibration signals for controlling the first and second vibrators to generate vibration of the housing that is localized to remain on a straight line in real space with a user position and the sound localization position as the object changes position on the display, thereby causing user perception of the generated vibration as being localized at a vibration localization position which is the same as the sound localization position to continue as the sound localization position shifts based on the changing position of the object.

16. An information processing method performed by a processor or cooperation of a plurality of processors included in an information processing apparatus comprising a hand-holdable housing, a display disposed on a front surface of the housing, and first and second spaced-apart vibrators disposed in the housing, the method comprising:
displaying, on the display, based on inputs to the information processing apparatus, an image of a virtual space, the image of the virtual space including an object;
generating, based on a sound source in the virtual space, sound signals for use in outputting, via speakers in communication with the information processing apparatus, sound for user perception as being localized at a sound localization position in real space outside the housing of the information processing apparatus, the sound localization position being based on a position at which the object is displayed on the display; and
generating, based on a vibration source in the virtual space, vibration signals for controlling the first and second vibrators to generate vibration of the housing that is localized to remain on a straight line in real space with a user position and the sound localization position as the object changes position on the display, thereby causing user perception of the generated vibration as being localized at a vibration localization position which is the same as the sound localization position to continue as the sound localization shifts based on the changing position of the object.

* * * * *